Nov. 2, 1926.
B. A. PETERSON
CREEL BRAKE
Filed April 28, 1923  2 Sheets-Sheet 1
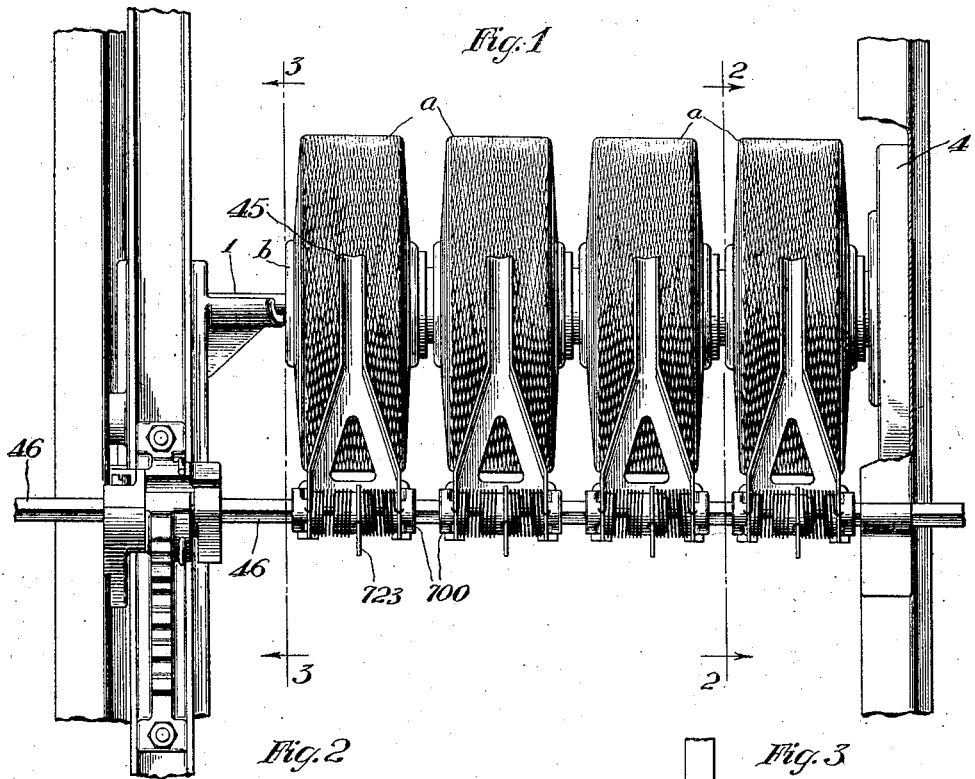
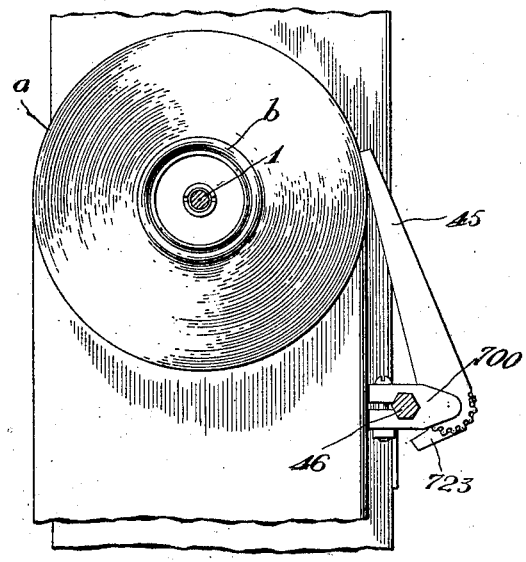
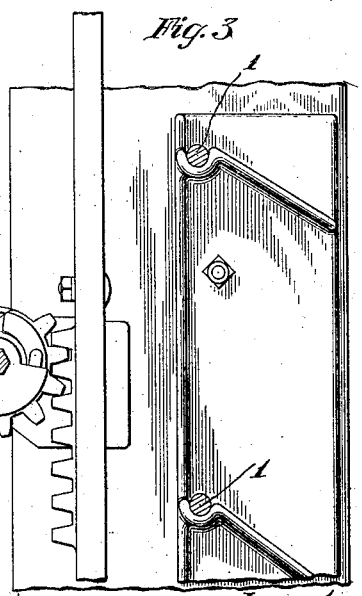
Inventor:
Burt A. Peterson Nov. 2, 1926. 1,605,276
B. A. PETERSON
CREEL BRAKE
Filed April 28, 1923 2 Sheets-Sheet 2
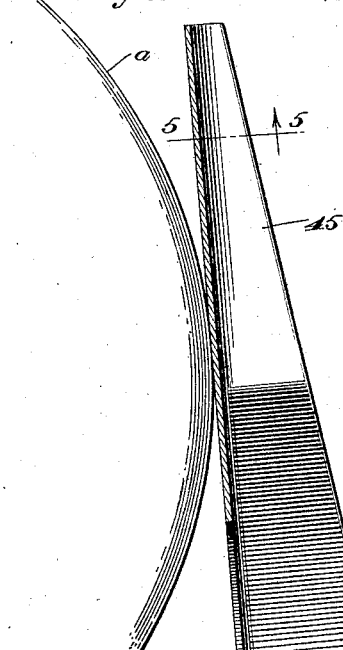
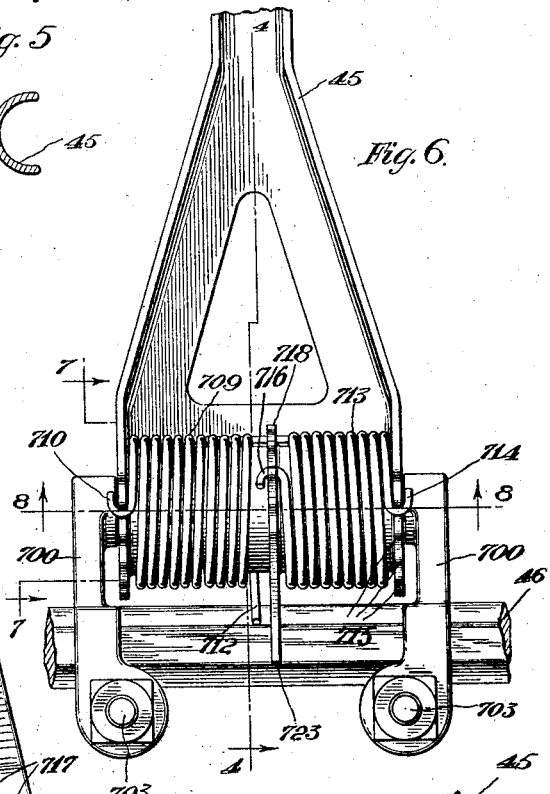
Inventor:
Burt A. Peterson Patented Nov. 2, 1926.

1,605,276

UNITED STATES PATENT OFFICE.

BURT A. PETERSON, OF ROCKFORD, ILLINOIS, ASSIGNOR TO BARBER-COLMAN COMPANY, OF ROCKFORD, ILLINOIS, A CORPORATION OF ILLINOIS.

CREEL BRAKE.

Application filed April 28, 1923. Serial No. 635,245.

This invention relates to warper creels and analogous apparatus, and particularly to brakes for checking rotation of the yarn masses mounted in the creel.

The invention has special reference to improvements upon the creel brakes shown in the Colman Patents Nos. 1,207,138 and 1,544,055. In the construction shown in said patents, the brake members are mounted upon a relatively long shaft, the brake members being slipped onto the shaft from the end of the latter. When a given brake member requires repair or replacement, it is necessary to remove not only the defective brake member, but also the brake members that are between the defective member and the end of the shaft.

One of the objects of the present invention is to facilitate the mounting of the brake members upon the shafts and their removal therefrom.

In the creel construction shown in the before-mentioned Colman patents, the brake member is operatively connected to the shaft by means including a pin passing through a hole in the shaft. It is very difficult to drill these holes along the length of the shaft with such accuracy that the pins shall all lie in the same plane. The present invention obviates the necessity of drilling such holes in the shaft, a form of construction being substituted which ensures that all the brake members, when in the released or thrown-out position, shall lie in the same plane.

In said Colman patents, the brake members are journaled directly upon the shaft. The latter is made of sufficiently large diameter so that twisting of the shaft shall not occur. Because of the relatively large diameter of the shaft, there may be a relatively great difference in the amount of friction in the bearings of the various brake members. In practice, the resulting difference in the pressure applied to the cheeses was sometimes sufficient to cause breakage of threads. In order to obviate this difficulty I mount the brake members in such a way that the journal bearings are of relatively small diameter. It will be seen that even though there be as great a variation in the coefficient of friction in the several bearings in my construction as in the Colman patents, the pressure applied to the cheeses will be more nearly uniform in my construction than in that of the Colman patents.

Further improvements will become apparent as the description proceeds.

In the accompanying drawings, Figure 1 is a fragmental elevation looking from the inner side of the creel, the brake members being shown in the "drag" position. Fig. 2 is a sectional view taken in the plane of line 2—2 of Fig. 1. Fig. 3 is a view taken in the plane of line 3—3 of Fig. 1. Fig. 4 is a view taken in the plane of line 4—4 of Fig. 6, showing the brake member in the braking position. Fig. 5 is a section on line 5—5 of Fig. 4. Fig. 6 is a fragmental view of one of the brake members in the braking position. Fig. 7 is a view taken in the plane of line 7—7 of Fig. 6. Fig. 8 is a section on line 8—8 of Fig. 6. Fig. 9 is a view similar to that of Fig. 4, but showing the brake member in drag position.

Without intending to limit the invention to creels for supporting any particular type of yarn mass, it is herein disclosed as embodied in a creel for supporting cylindrical cheeses a. Each cheese consists of yarn spirally wound around a tubular core b. The cheeses are rotatably supported upon spindles 1, four cheeses in the present embodiment being carried by each spindle. The spindles 1 are arranged in groups of three, only two of which are shown in the present drawings (see Fig. 3), each group being fixed to a base 4 (Fig. 1). Each base 4 with its row of spindles 1 may be termed a trident. The tridents may be removably supported in the framework of the creel in any suitable manner.

For each cheese there is provided a brake member of suitable character. Herein is shown a metal plate or arm 45 which presents a polished convex surface to the yarn mass and is arranged to bear against the periphery of the cheese. The brake arms 45 are supported upon horizontal rock shafts 46 which are mounted upon the inner side of the creel frame. The brake arm is not pivoted directly upon the shaft 46, but, on the contrary, is pivotally supported by two brackets or crank arms 700. To oviate the necessity of drilling holes in the shaft to receive means for securing the brackets against rotation upon the shaft, I employ a shaft of non-circular cross-section, as, for example, the hexagonal form herein shown. The brackets 700 have openings 701 therethrough conforming to the cross-sectional shape of the shaft. The brackets 700 are slotted as shown at 702 in Figs. 4 and 9 so that they may be clamped upon the shaft 46 in adjusted position by means of bolts 703.

The brackets 700 are provided with sockets 704 (Fig. 8) to receive the ends of the pivot 705 of the brake arm. At opposite sides of the base of the brake arm are annular inturned flanges 706 (Fig. 8) which define openings in which are secured bearings fitting upon the pivot 705. It is important in apparatus of this character to reduce to a minimum the necessity for lubrication. I therefore employ wooden blocks 707 fitting rotatably upon the pivot 705 and provided with a metallic binding or casing 708 having a driving fit within the flange 706.

Upon comparing Fig. 8 herein with Fig. 10 of the Colman Patent No. 1,544,055, it will be noted that the pivot 705 herein used provides journals of very much smaller diameter than in the case of the shaft shown in the Colman patent, with a consequent great reduction in the difference in pressure applied by the various brake members.

In the construction herein shown, the brake arm is yieldingly pressed against the cheese, two springs being interposed between the brake arm and the shaft. One of these springs is used to apply a light or drag pressure to the cheese, the pressure of both springs being applied when rotation of the cheese is to be stopped.

A torsion spring 709 is arranged concentrically of the pivot 705, the end 710 of said spring being hooked into any one of a series of notches 711 in a flange which is concentric with and adjacent to one of the bearings of the brake arm. The other end 712 of the spring 709 bears against the shaft 46, as shown in Fig. 9. When the brake arm 45 is in the fully released or thrown-out position, the spring 709 holds the brake arm against the shaft 46.

A torsion spring 713 which preferably is stronger than the spring 709 is arranged around the pivot 705, the hooked end 714 of said spring engaging in notches 715 in a flange concentric with and adjacent to one of the bearings of the brake arm. The other end 716 of the spring 713 is hooked into notches 717 formed in the periphery of a collar 718 that fits against a shoulder 719 (Fig. 8) on a wooden block 720 mounted on the pivot 705. On the collar 718 is a shoulder 721 (Fig. 9) which is normally held against the portion 722 of the brake arm by means of the spring 713. On the collar 718 is a lug 723 adapted to engage the shaft 46, as shown in Fig. 4.

The means for rocking the shaft 46 to actuate the brake arms 45 may be of any suitable character, and need not be herein described.

In operation, when the creel brakes are to be applied, the shaft or shafts 46 are turned in the direction indicated by the arrow in Fig. 9 into the position shown in Fig. 4, whereby the brake arm 45 is pressed against the periphery of the cheese by both springs 709 and 713. The brake-applying movement of the shaft 46 is so rapid that the pressure of both springs is applied practically instantaneously to the cheese. In the return movement of the shaft 46, the shaft is first turned through ninety degrees into the position shown in Fig. 9, which is far enough to place the stop portion 721 on the collar 718 in engagement with the stop portion 722 on the brake arm 45 and to withdraw the lug 723 from the shaft 46. Both ends of the spring 713 then bears against portions of the brake arm 45 and consequently said spring exerts no force tending to swing the brake arm on the axis 705. Such ninety-degree movement of the shaft 46 leaves the brake arm 45 pressed against the periphery of the cheese by the torsion spring 709, this pressure being merely sufficient to cause slight resistance to rotation of the cheese. Such resistance is necessary or desirable when the warper beam is being revolved slowly, preparatory to shifting to high speed. The drag or yarn-tensioning pressure on the cheeses also is of advantage when the warper is at rest, as it prevents the cheeses from revolving too freely when threads are drawn forward in replenishing the creel or piercing up broken threads, or in the event that any of the threads are accidentally disturbed. The drag pressure, however, is necessary only when the cheeses are mounted to revolve very freely, as in the construction herein disclosed. In a creel wherein the cheeses are not mounted to rotate with great freedom, the construction providing the drag pressure may be dispensed with.

When the drag pressure is to be removed, the shaft 46 is turned still farther in the direction opposite to that indicated by the arrow in Fig. 9 until the brake arm 45 rests against the shaft 46 and is out of contact with the cheese.

Should it become necessary to replace a broken spring or effect any other repairs in connection with a brake arm 45, said arm may be quickly removed by simply releasing one of the screws 703 and sliding the corresponding bracket 700 away from the other bracket far enough to allow the pivot 705 to be disengaged from the sockets 704.

Inasmuch as the position of the brackets 700 circumferentially of the shaft 46 is determined by the polygonal form of said shaft, it will be seen that all the brackets 700 will occupy the same plane, and that when the shaft 46 is turned to hold the brake arms out of contact with the cheeses the brake arms will all lie in the same plane; consequently when the brakes are applied to stop the cheeses or tension the yarn, they will bear against cheeses of a given diameter with equal force.

It will be observed that each brake arm 45 with its two spaced alined bearings 707, pivot 705, collar 718 and torsion springs 709 and 713 constitutes a unit which may be readily incorporated in and removed from the creel. The brackets 700 provide means for supporting the unit eccentrically of the rock shaft.

I claim as my invention:

1. In a creel brake, a rock shaft, a crank arm on the shaft, a brake arm pivoted on the crank arm, a collar concentric with the pivot of the brake arm, a torsion spring surrounding said pivot, one end of said spring engaging the brake arm and the other end engaging said collar, coacting stop portions on said collar and brake arm, a finger on said collar arranged to engage said shaft for turning the collar to separate said stop portions and increase the torsion of the spring, and a second torsion spring surrounding said pivot, one end of the second spring engaging said brake arm and the other end engaging said shaft.

2. In a creel brake, a brake arm having a pivot, a collar concentric with said pivot, a torsion spring surrounding the pivot, one end of said spring engaging the brake arm and the other end engaging said collar, coacting stop portions on said collar and brake arm, said spring normally holding said stop portions in contact with each other, a finger on said collar for turning the collar to separate said stop portions and thus increase the torsion of the spring, whereupon said spring tends to turn the brake-arm in the brake-applying direction, a second torsion spring surrounding said pivot, one end of the second spring engaging said brake arm, and an abutment for the other end of the second spring, the second spring tending at all times to turn the brake-arm in the brake-applying direction.

3. A creel having, in combination, means to support a yarn mass, a rock shaft of non-circular cross-section, two brackets having openings corresponding in form to the cross-sectioned form of the shaft, said shaft extending through said openings, each bracket being slotted, a bolt engaging the slotted portion of the bracket to clamp the latter upon the shaft, said brackets having sockets, a pivot the ends of which lie in said sockets, a brake arm pivotally mounted on said pivot, and spring means tending to turn said brake arm on the axis of said pivot.

4. A creel having, in combination, means to support a yarn mass, a rock shaft, two brackets carried by said shaft, one of said brackets being slidable on the shaft toward and away from the other bracket, a brake arm pivotally supported by said brackets, spring means tending to swing the brake arm, and means for rocking said shaft to carry the brake arm into and out of operative position.

5. A creel having, in combination, means to support a yarn mass, a rock shaft of non-circular cross-section, two brackets carried by said shaft, said brackets being slidable on the shaft toward and away from each other, a brake arm pivotally supported by said brackets, spring means tending to swing the brake arm, and means for rocking said shaft to carry the brake arm into and out of operative position.

6. A creel having, in combination, means to support a yarn mass, a rock shaft of non-circular cross-section, two brackets clamped on said shaft, a brake arm pivotally supported by said brackets, spring means tending to swing the brake arm, and means for rocking said shaft to carry the brake arm into and out of operative position.

7. A creel having, in combination, means to support a yarn mass, a rock shaft, two crank arms fixed to said shaft, a pivot pin held between the free ends of said crank arms, a brake arm supported by said pivot pin, spring means tending to swing the brake arm toward the cheese, and means for rocking said shaft to carry the brake arm into and out of operative position.

8. A creel having, in combination, means to support a yarn mass, a rock shaft, a crank arm on said shaft, a brake arm pivoted on the crank arm, spring means tending to swing the brake arm toward the yarn mass, and means to rock the shaft to carry the brake arm into and out of operative position.

9. In a creel brake, a metallic brake arm having two wooden bearing blocks secured thereto, a pivot extending through said bearing blocks, means to support the pivot, and spring means tending to turn said brake arm on the axis of said pivot.

10. A creel having, in combination, means to support a yarn mass, a rock shaft, two brackets relatively slidable on said shaft toward and away from each other, means to clamp the brackets upon the shaft in adjusted position, said brackets having sockets, a pivot the ends of which lie in said sockets, a brake arm pivotally mounted on said pivot, and spring means tending to turn said brake arm on the axis of said pivot toward the yarn mass.

11. A creel having, in combination, means to support a series of yarn masses, a rock shaft, a series of brackets carried by said shaft, said brackets occupying the same plane, brake arms pivotally supported by said brackets, there being a brake arm for each yarn mass, spring means tending to swing the brake arms, and means for rocking said shaft to carry the brake arms into and out of operative position.

12. A creel brake unit consisting of a brake arm having two alined bearings, a pivot extending through said bearings, a collar on said pivot between the bearings, a torsion spring between said collar and one of the bearings and connected to said arm, and a torsion spring between said collar and the other bearing, and connected to said collar and arm, said collar and arm having stop portions which are normally held in contact with each other by the second spring.

13. A creel having, in combination, means to support a yarn mass, a rock shaft, a pivoted brake arm supported by said shaft eccentrically thereof, and two springs both arranged to press the brake arm against the yarn mass when the shaft is turned in a certain direction, said springs acting successively.

14. A creel having, in combination, a rock shaft, a series of units each comprising a brake arm, a pivot for the arm, and spring means surrounding the pivot and connected to the brake arm, and means for mounting said units on the shaft whereby any unit may be removed without disturbing the other units, said mounting means comprising two members for each unit which hold the unit between them and which are adapted to be moved apart to release the unit.

15. A creel comprising a shaft, a series of pivots supported on said shaft, said pivots being much smaller in diameter than said shaft, a brake member mounted on each pivot, individual spring means for each brake member tending to turn the same on its pivot, and means to turn the shaft to swing the brake members into and out of braking position.

In testimony whereof, I have hereunto affixed my signature.

BURT A. PETERSON.